United States Patent
Lee et al.

(10) Patent No.: US 11,012,846 B2
(45) Date of Patent: May 18, 2021

(54) METHOD AND DEVICE FOR RECEIVING DOWNLINK USER DATA

(71) Applicant: LG ELECTRONICS INC., Seoul (KR)

(72) Inventors: Youngdae Lee, Seoul (KR); Sangwon Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/347,434

(22) PCT Filed: Nov. 2, 2017

(86) PCT No.: PCT/KR2017/012317
§ 371 (c)(1),
(2) Date: May 3, 2019

(87) PCT Pub. No.: WO2018/084592
PCT Pub. Date: May 11, 2018

(65) Prior Publication Data
US 2019/0268750 A1    Aug. 29, 2019

Related U.S. Application Data

(60) Provisional application No. 62/417,274, filed on Nov. 3, 2016.

(51) Int. Cl.
*H04W 76/27*    (2018.01)
*H04W 8/00*    (2009.01)
(Continued)

(52) U.S. Cl.
CPC .......... *H04W 8/005* (2013.01); *H04L 5/0055* (2013.01); *H04W 8/24* (2013.01); *H04W 68/00* (2013.01);
(Continued)

(58) Field of Classification Search
CPC ..... H04W 8/005; H04W 72/12; H04W 68/00; H04W 8/24; H04W 76/27; H04W 76/28; H04L 5/0055
See application file for complete search history.

(56) References Cited

U.S. PATENT DOCUMENTS

2019/0191483 A1* 6/2019 Ryoo ............... H04W 12/04033
2019/0215800 A1* 7/2019 Fujishiro ............... H04W 76/38
2020/0037345 A1* 1/2020 Ryoo ................ H04W 72/1268

FOREIGN PATENT DOCUMENTS

EP    3487258    5/2019
EP    3499974    6/2019

OTHER PUBLICATIONS

3GPP Meeting #95, Aug. 2016, (Details of Lightly Connected UEs, R2-164986).*

(Continued)

*Primary Examiner* — Lakeram Jangbahadur
(74) *Attorney, Agent, or Firm* — Lee, Hong, Degerman, Kang & Waimey

(57) ABSTRACT

A method for a terminal to receive downlink user data in a wireless communication system and a device supporting the method are provided. The method may comprise: a step of entering an RRC_INACTIVE state; a step of receiving, from a base station, a notification indication indicating if downlink data is transmitted in the RRC_INACTIVE state; a step of transmitting an ID of a terminal to the base station; and a step of receiving, based on the indication, a data unit from the base station in the RRC_INACTIVE state.

9 Claims, 12 Drawing Sheets

(51) Int. Cl.
  *H04W 76/28* (2018.01)
  *H04L 5/00* (2006.01)
  *H04W 8/24* (2009.01)
  *H04W 68/00* (2009.01)
  *H04W 72/12* (2009.01)

(52) U.S. Cl.
  CPC ........... *H04W 72/12* (2013.01); *H04W 76/27* (2018.02); *H04W 76/28* (2018.02)

(56) References Cited

OTHER PUBLICATIONS

European Patent Office Application Serial No. 17867709.2, Search Report dated Oct. 8, 2019, 12 pages.
Intel, "Details of Lightly Connected UEs", 3GPP TSG RAN WG2 Meeting #95, R2-164986, Aug. 2016, 3 pages.
Ericsson, "RRC Suspend/Resume for Light Connection", 3GPP TSG RAN WG2 Meeting #95, R2-165561, Aug. 2016, 6 pages.
PCT International Application No. PCT/KR2017/012317, International Search Report dated Feb. 1, 2018, 4 pages.
Qualcomm Incorporated, "NR DR/UL based mobility for active and inactive states," 3GPP TSG-RAN WG1 #86bis, R1-1610173, Oct. 2016, 9 pages.
Catt, "Small data transmission in inactive state," 3GPP TSG-RAN WG2 #95bis, R2-166118, Oct. 2016, 6 pages.
Oppo, "Discussion on Efficient Small Data transmission in "Inactive" State," 3GPP TSG-RAN WG2 #95bis, R2-166187, Oct. 2016, 7 pages.
Qualcomm Incorporated, "Data Transmission in the NR inactive state," 3GPP TSG-RAN WG2 #95bis, R2-167067, Oct. 2016, 5 pages.
Huawei, "The procedure to activate RRC inactive connected mode," SA WG2 Meeting #S2-116BIS, S2-165388, Sep. 2016, 5 pages.

* cited by examiner

METHOD AND DEVICE FOR RECEIVING DOWNLINK USER DATA

CROSS-REFERENCE TO RELATED APPLICATIONS

This application is the National Stage filing under 35 U.S.C. 371 of International Application No. PCT/KR2017/012317, filed on Nov. 2, 2017, which claims the benefit of U.S. Provisional Application No. 62/417,274, filed on Nov. 3, 2016, the contents of which are all hereby incorporated by reference herein in their entirety.

BACKGROUND OF THE INVENTION

Field of the Invention

The present invention relates to a wireless communication system and, more particularly, to a method for a user equipment in an RRC_INACTIVE state to receive downlink user data and a device supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In the discussion of NR standardization, an RRC_CONNECTED state and an RRC_IDLE state are defined by default as an RRC state, and an RRC_INACTIVE state is additionally introduced. A user equipment (UE) in the RRC_INACTIVE state performs a radio control procedure similarly to the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state.

SUMMARY OF THE INVENTION

Even when a user equipment (UE) is in an RRC_INACTIVE state, data transmission and reception needs to be allowed. However, a procedure in which a UE in the RRC_INACTIVE state performs data transmission and reception and a procedure in which a base station (BS) of a network controls data transmission and reception with a UE in the RRC_INACTIVE state have not yet been proposed. Therefore, it is needed to propose a method for a UE in the RRC_INACTIVE state to perform data transmission and reception and a device supporting the same.

In accordance with one embodiment, there is provided a method in which a UE receives downlink user data in a wireless communication system. The method may include: entering an RRC_INACTIVE state; receiving, from a BS, a notification indication indicating whether downlink data is transmitted in the RRC_INACTIVE state; transmitting an ID of the UE to the BS; and receiving a data unit from the BS on the basis of the indication in the RRC_INACTIVE state.

In accordance with another embodiment, there is provided a UE receiving downlink user data in a wireless communication system. The UE may include: a memory; a transceiver; and a processor to connect the memory and the transceiver, wherein the processor may be configured to: enter an RRC_INACTIVE state; control the transceiver to receive, from a BS, a notification indication indicating whether downlink data is transmitted in the RRC_INACTIVE state; control the transceiver to transmit an ID of the UE to the BS; and control the transceiver to receive a data unit from the BS on the basis of the indication in the RRC_INACTIVE state.

It is possible to efficiently provide downlink user data to a UE in the RRC_INACTIVE STATE.

DESCRIPTION OF EXEMPLARY EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
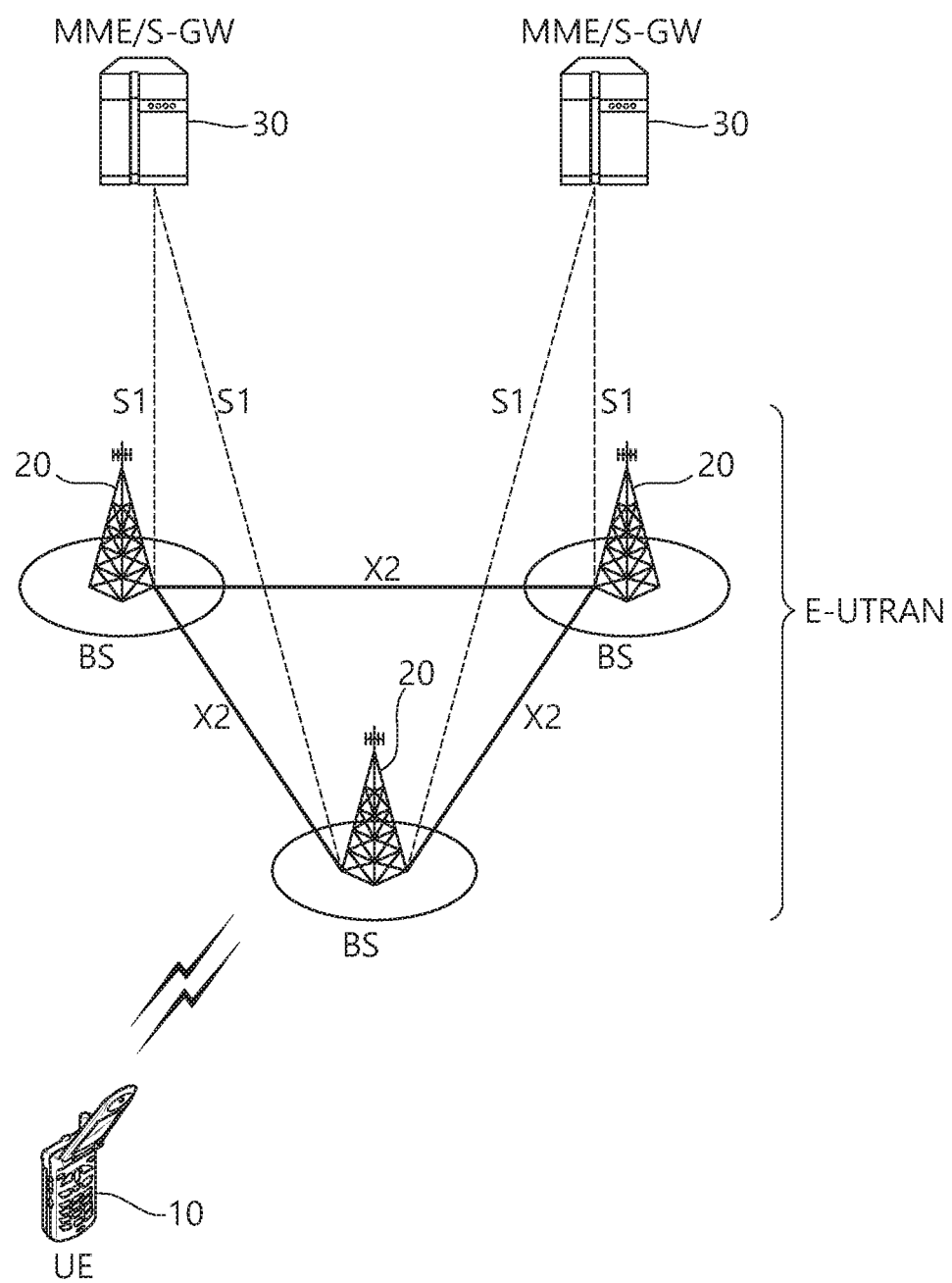
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighbor eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
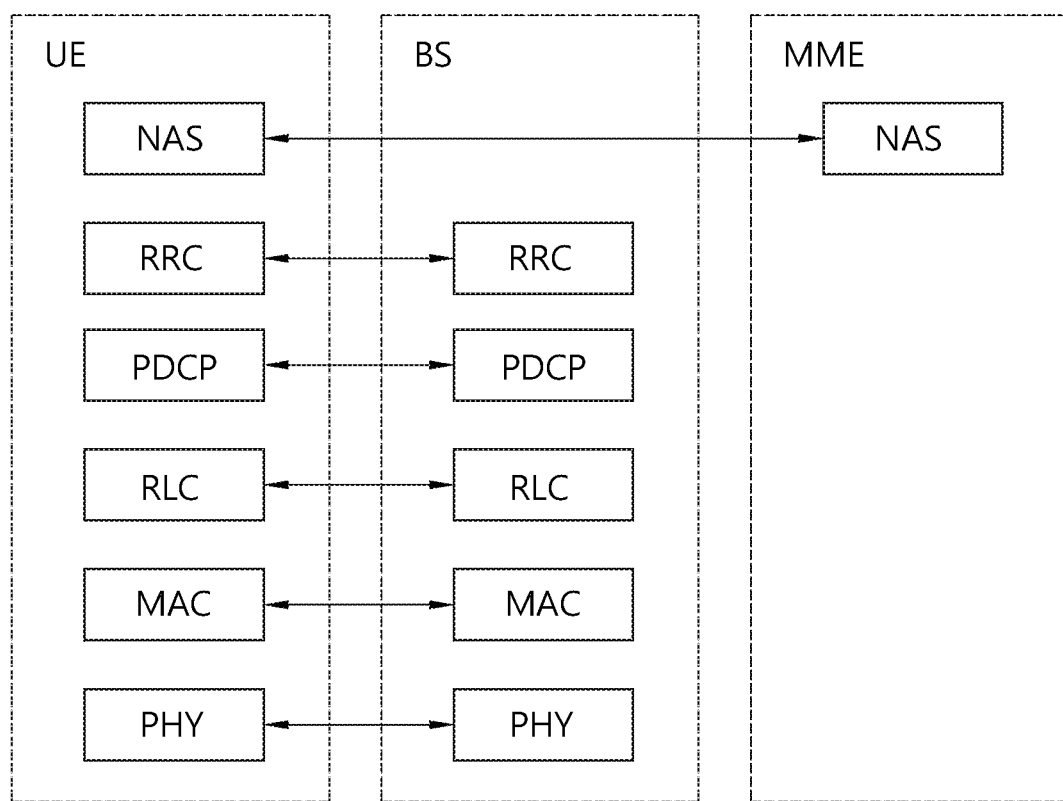
FIG. 2 shows a control plane of a radio interface protocol of an LTE system.
Figure 3:
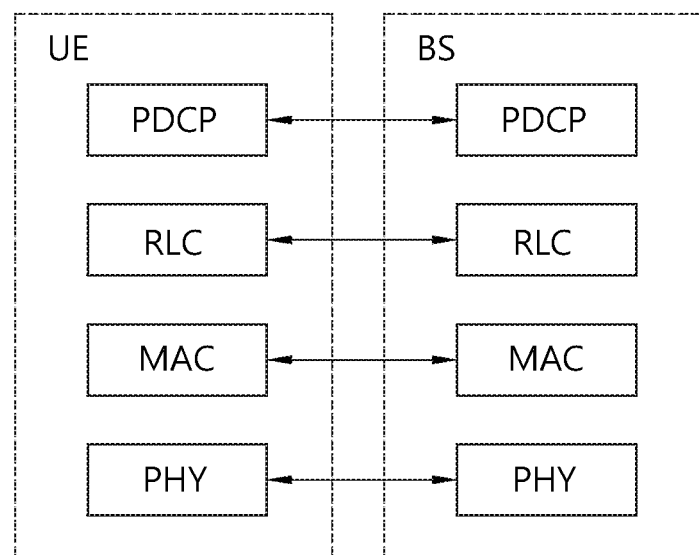
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and an RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE needs to transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a 5G Network Structure is Described.

Figure 4:
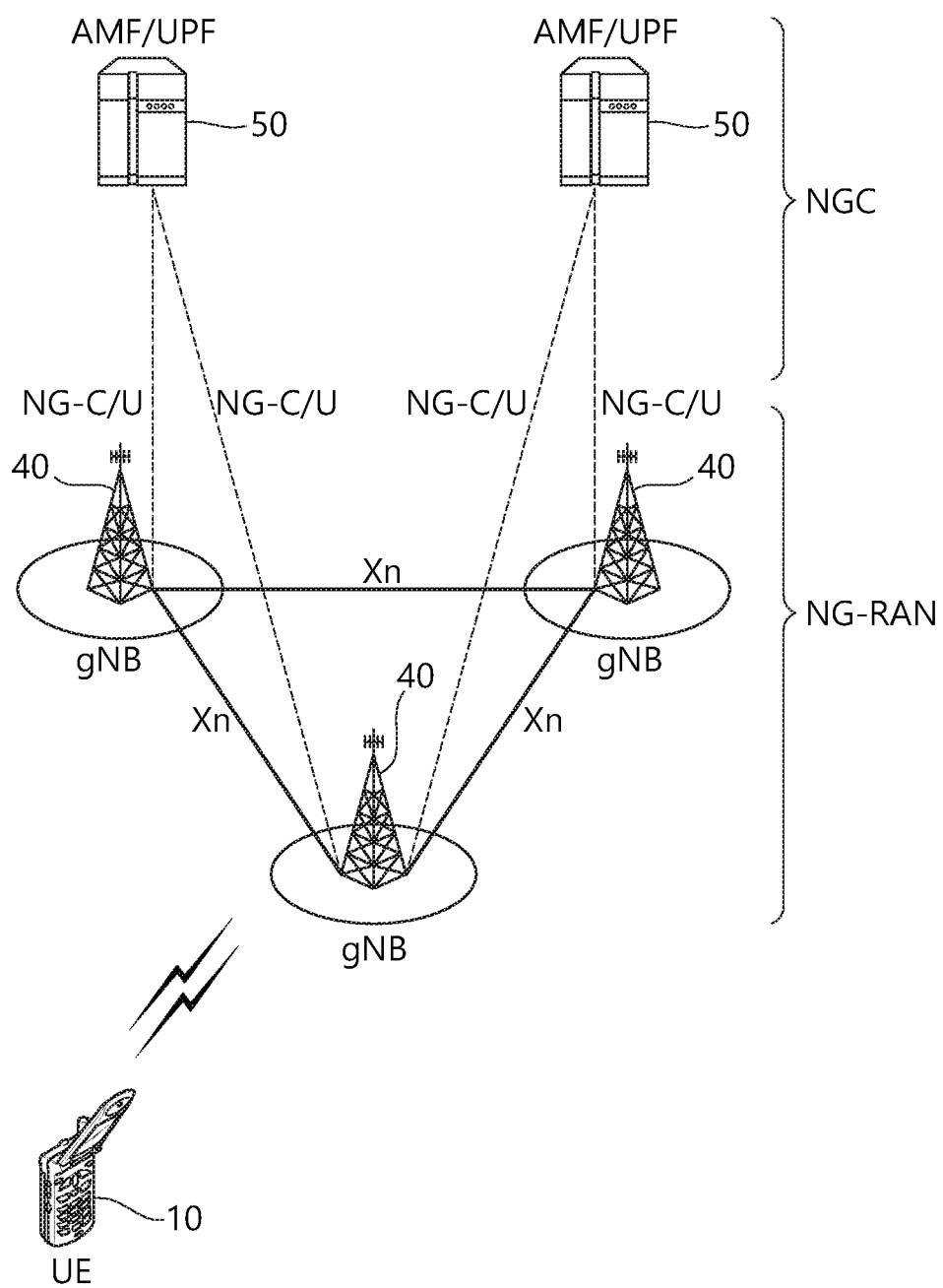
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE State of a UE is Described.

In the discussion on NR standardization, an RRC_INACTIVE state has been newly introduced in addition to the existing RRC_CONNETED state and RRC_IDLE state. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG interface between a gNB and a NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

For a UE in a lightly connected mode, an MME may maintain the S1 connection of the activated UE in order to hide a state transition and mobility from a core network. That is, for a UE in the RRC_INACTIVE state, an AMF may maintain the NG connection of the activated UE in order to hide a state transition and mobility from a next-generation core (NGC). In this specification, an RRC_INACTIVE state may be similar in concept to a lightly connected mode, a lightweight connected mode, or a semi-connected mode.

Even when a UE is in the RRC_INACTIVE state, data transmission and reception needs to be allowed. However, a procedure in which a UE in the RRC_INACTIVE state performs data transmission and reception and a procedure in which a BS (e.g., a gNB of a new RAT) of a network controls data transmission and reception with a UE in the RRC_INACTIVE state have not yet been proposed. Therefore, it is needed to propose a method for a UE in the RRC_INACTIVE state to perform data transmission and reception and a device supporting the same.

Figure 5:
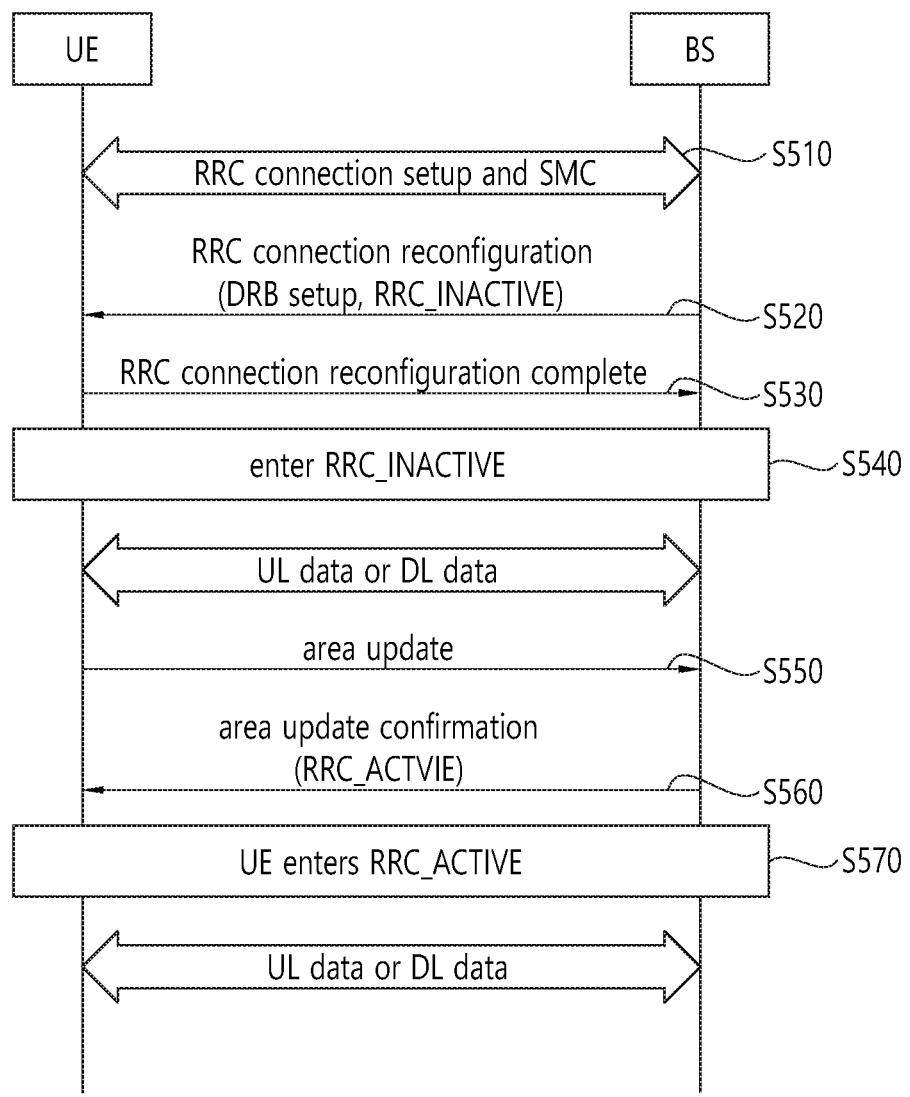
FIG. 5 illustrates a procedure in which a UE in an RRC_INACTIVE state transmits and receives data according to an embodiment of the present invention.

FIG. 5 illustrates a procedure in which a UE in the RRC_INACTIVE state transmits and receives data according to an embodiment of the present invention.

The UE may enter the RRC_INACTIVE state and may transition to an RRC_ACTIVE state. On the contrary, the UE may enter the RRC_ACTIVE state and may transition to the RRC_INACTIVE state. In this specification, the RRC_ACTIVE state may be similar to the RRC_CONNECTED state.

Referring to FIG. 5, in step S510, the UE may perform RRC connection setup and a security mode command (SMC) procedure with a BS. When the UE enters the RRC_CONNECTED state from the RRC_IDLE state, the UE may perform RRC connection establishment, AS security activation, and radio bearer setup.

In step S520, the BS may transmit an RRC connection reconfiguration message to the UE. The RRC connection configuration message may be used for radio bearer setup and transition to the RRC_INACTIVE state.

In step S530, the UE may transmit an RRC connection reconfiguration complete message to the BS.

In step S540, the UE may enter the RRC_INACTIVE state. When the UE transitions to the RRC_INACTIVE state, the UE may not release a radio bearer set up by RRC connection reconfiguration. Accordingly, the UE may maintain the radio bearer even after transitioning to the RRC_INACTIVE state. That is, when the radio bearer is established for the UE, the established radio bearer may be maintained in both the UE and the BS while the UE is in the RRC_INACTIVE state. Furthermore, AS security may be kept activated in the RRC_INACTIVE state. That is, when the AS security is activated for the UE, the AS security may be kept activated for both the UE and the BS while the UE is in the RRC_INACTIVE state. Preferably, only in a case where data transmission is allowed in the RRC_INACTIVE state, the established radio bearer may be maintained in both the UE and the BS while the UE is in the RRC_INACTIVE state.

If data transmission is not allowed in the RRC_INACTIVE state, the UE that has transitioned to the RRC_INACTIVE state may suspend all radio bearers. For example, if data transmission is not allowed in the RRC_INACTIVE state, the UE may suspend all radio bearers upon receiving an instruction to transition to the RRC_INACTIVE state from the BS. For example, if data transmission is not allowed in the RRC_INACTIVE state, the UE may suspend all radio bearers upon entering the RRC_INACTIVE state.

However, if data transmission is allowed in the RRC_INACTIVE state, the UE may not suspend some radio bearers in which data transmission is allowed in the RRC_INACTIVE state when transitioning to the RRC_INACTIVE state. For example, the UE may not suspend some radio bearers dependent on QoS. In this case, when the BS instructs the UE to transition to the RRC_INACTIVE state, the BS may indicate which radio bearer is not suspended in the RRC_INACTIVE state. The BS may indicate which radio bearer is used for data transmission in the RRC_INACTIVE state. That is, if data transmission is allowed in the RRC_INACTIVE state for a particular radio bearer, the UE having entered the RRC_INACTIVE state may not suspend the particular radio bearer in the RRC_INACTIVE state on the basis of a configuration from the BS. On the other hand, the UE may suspend all radio bearers other than the particular radio bearer upon entering the RRC_INACTIVE state. Therefore, data transmission on all the radio bearers other than the particular radio bearer may be allowed only while the UE is in the RRC_ACTIVE state.

The BS may determine whether data transmission is allowed in the RRC_INACTIVE state for each UE. Alternatively, the BS may determine whether data transmission is allowed in the RRC_INACTIVE state for each radio bearer. The BS may determine whether data transmission is allowed in the RRC_INACTIVE state for each UE or each radio bearer, for example, depending on radio bearers established for the UE. When the UE enters the RRC_INACTIVE state, the BS may indicate to the UE whether data transmission is allowed in the RRC_INACTIVE state for a particular radio bearer.

In addition, if the UE moves from the RRC_INACTIVE state to the RRC_ACTIVE state, the UE may resume the suspended radio bearer. For example, if the BS instructs the UE in the RRC_INACTIVE state to transition to the RRC_INACTIVE state, the UE may resume the suspended radio bearer.

If data transmission is allowed in the RRC_INACTIVE state, both downlink transmission and uplink transmission may be allowed unless a unidirectional bearer is established for the UE. In downlink transmission, since the UE periodically monitors an RAN notification in the RRC_INACTIVE state, the RAN notification may trigger downlink transmission in the RRC_INACTIVE state. That is, if data transmission is allowed in the RRC_INACTIVE state, the RAN notification may be used for the UE to receive downlink data in the RRC_INACTIVE state. The RAN notification may also be referred to as an RAN paging, an RAN notification indication, or a notification indication.

The RAN notification may be used to trigger an area update in order to transition the UE in the RRC_INACTIVE state to the RRC_ACTIVE state. Therefore, the RAN notification needs to be able to indicate to the UE whether the UE can receive downlink data in the RRC_INACTIVE state. In addition, the RAN notification needs to be able to instruct the UE to transition to the RRC_ACTIVE state so that the UE receives downlink data in the RRC_ACTIVE state. The RAN notification indicating that downlink data can be received in the RRC_INACTIVE state can indicate a schedule for downlink transmission to the UE. Therefore, the UE in the RRC_INACTIVE state may receive downlink data according to scheduling information.

For example, it is assumed that the RAN notification instructs the UE to transition to the RRC_ACTIVE state so that the UE receives downlink data in the RRC_ACTIVE state. In step S550, the UE may transmit an area update to the BS in order to transition to the RRC_ACTIVE state upon receiving the RAN notification.

In step S560, the UE may receive an area update confirmation from the BS. In step S570, the UE may enter the RRC_ACTIVE state. Accordingly, the UE may resume all radio bearers, and the BS may transmit downlink data through any radio bearer.

Figure 6:
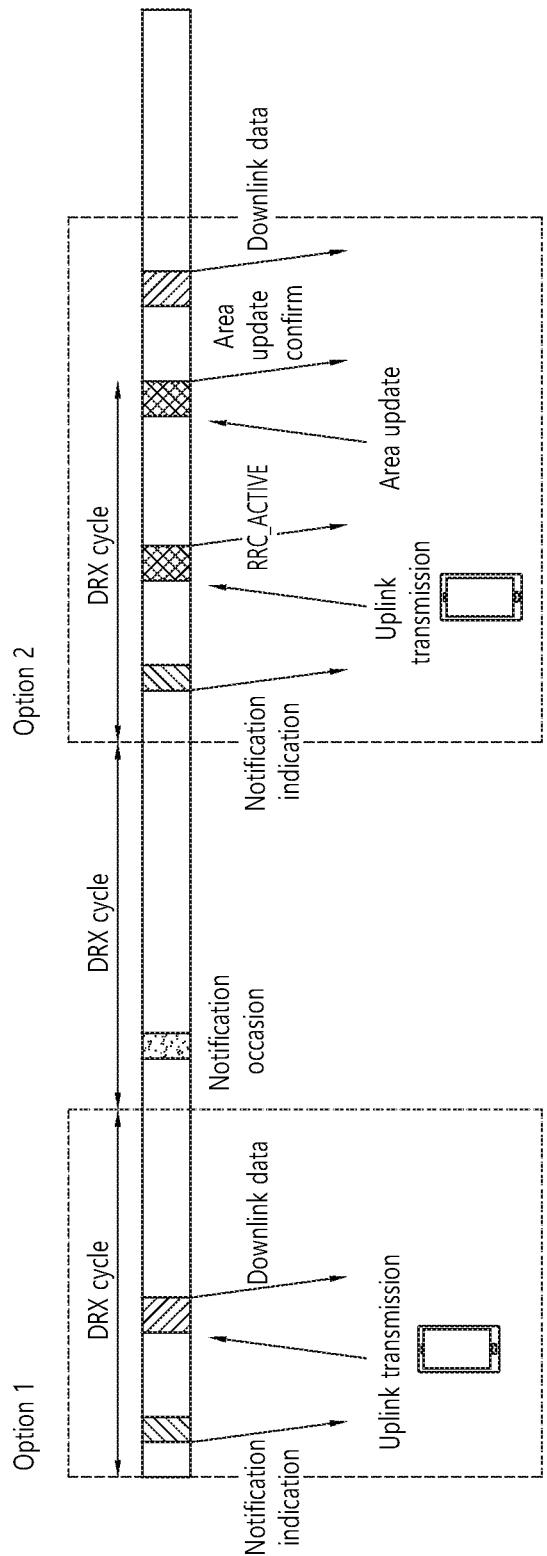
FIG. 6 illustrates a procedure in which a UE receives downlink data in the RRC_INACTIVE state or in an RRC_ACTIVE state according to an embodiment of the present invention.

FIG. 6 illustrates a procedure in which a UE receives downlink data in the RRC_INACTIVE state or in the RRC_ACTIVE state according to an embodiment of the present invention.

Specifically, option 1 of FIG. 6 shows a procedure in which a UE receives downlink data in the RRC_INACTIVE state, and option 2 of FIG. 6 shows a procedure in which a UE receives downlink data in the RRC_INACTIVE state. An RAN notification procedure may trigger either transition to the RRC_ACTIVE state or data transmission in the RRC_INACTIVE state for a particular UE.

Referring to FIG. 6, when the UE is in the RRC_INACTIVE state, a BS may determine whether downlink data can be transmitted in the RRC_INACTIVE state (i.e., without transition to the RRC_ACTIVE state) or downlink data can be transmitted after transition to the RRC_ACTIVE state. The UE in the RRC_INACTIVE state may periodically monitor an RAN notification indication in a particular time interval. That is, the UE in the RRC_INACTIVE state may periodically monitor an RAN notification indication on a notification occasion. The RAN notification indication may trigger uplink transmission along with a UE ID.

Referring to option 1 of FIG. 6, when the BS determines downlink transmission in the RRC_INACTIVE state, the BS may transmit downlink data through a radio bearer. For example, when the BS determines downlink transmission in the RRC_INACTIVE state and data is available for a radio bearer not suspended, the BS may transmit downlink data through the radio bearer.

Referring to option 2 of FIG. 6, when the BS determines downlink transmission in the RRC_ACTIVE state, the BS may transmit a notification message indicating transition to the RRC_ACTIVE state to the UE. Upon receiving the notification message, the UE may transmit an area update message to the BS in order to transition to the RRC_AC-TIVE state. After the UE enters the RRC_ACTIVE state, the UE may resume all radio bearers. Accordingly, the BS may transmit downlink data through any of the radio bearers.

Figure 7:
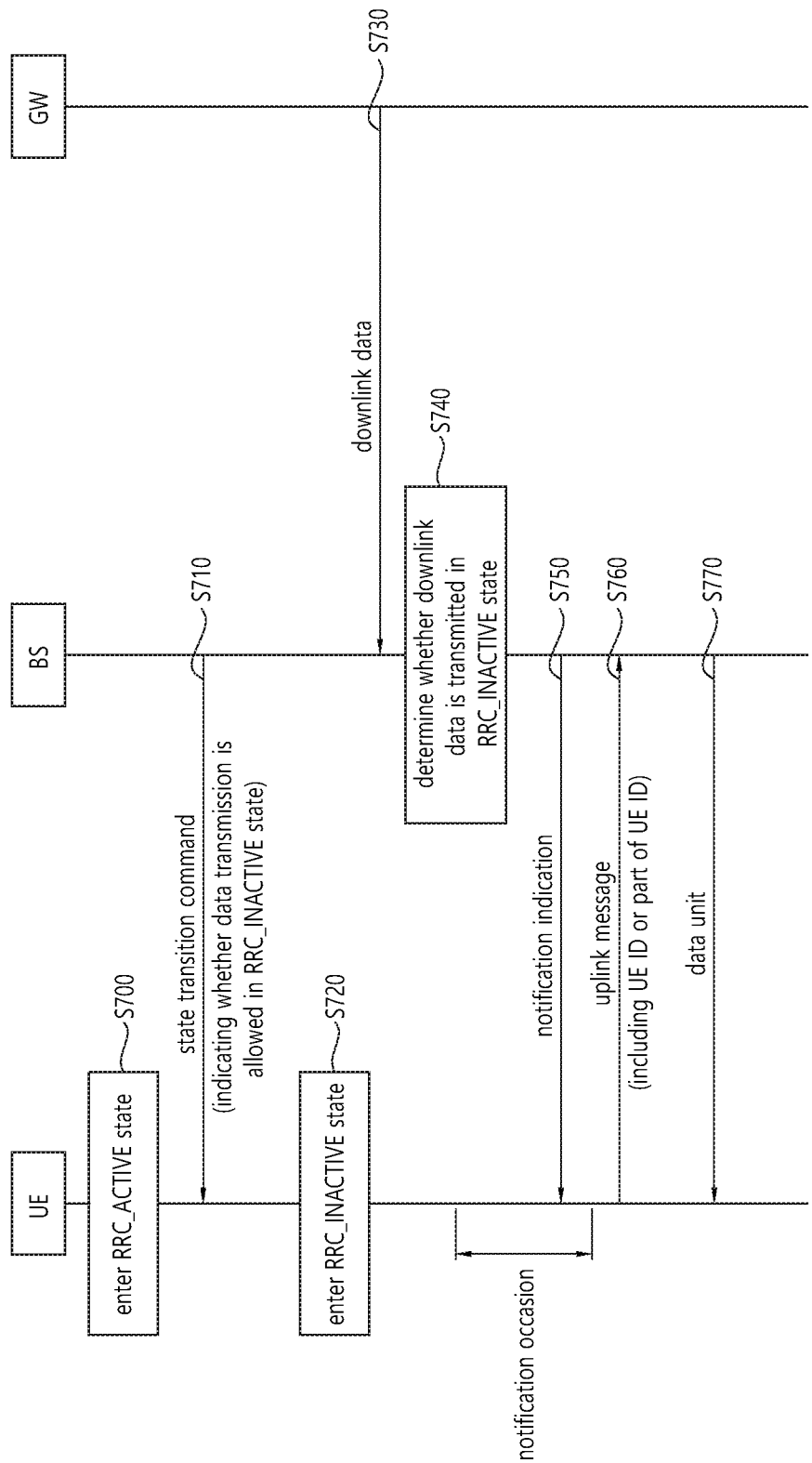
FIG. 7 illustrates a procedure in which a UE receives a data unit according to an embodiment of the present invention.

FIG. 7 illustrates a procedure in which a UE receives a data unit according to an embodiment of the present invention.

Referring to FIG. 7, in step S700, the UE in the RRC_IDLE state may establish an RRC connection with a BS and may enter the RRC_ACTIVE state.

In step S710, the UE in the RRC_ACTIVE state may receive a command from the BS. The command may be a state transition command. In the command, the BS may indicate whether downlink data transmission is allowed in the RRC_INACTIVE state.

Whether downlink data transmission is allowed in the RRC_INACTIVE state may be indicated for each radio bearer. Alternatively, whether downlink data transmission is allowed in the RRC_INACTIVE state may be indicated for each priority level associated with a radio bearer. For example, whether downlink data transmission is allowed may be indicated for a logical channel priority, a quality class identifier (QCI), or a ProSe per packet priority (PPPP).

The radio bearer may be only a data radio bearer established between the UE and the BS for user data. That is, the BS may indicate whether downlink data transmission is allowed in the RRC_INACTIVE state only for each data radio bearer.

The radio bearer may be only a signaling radio bearer established between the UE and the BS for an RRC message delivery or an NAS message delivery. That is, the BS may indicate whether downlink data transmission is allowed in the RRC_INACTIVE state only for each signaling radio bearer.

The radio bearer may be either a data radio bearer or a signaling radio bearer. That is, the BS may indicate whether downlink data transmission is allowed in the RRC_INAC-TIVE state for either the data radio bearer or the signaling radio bearer.

In the command, the BS may allocate a UE ID used to identify the UE at least while the UE is in the RRC_INAC-TIVE state. The UE may store the UE ID.

In step S720, upon receiving the command from the BS, the UE may enter the RRC_INACTIVE state. The RRC_I-NACTIVE state may indicate a state in which cell reselection is used and a state in which UE context is stored in the BS. The UE in the RRC_INACTIVE state may periodically monitor an RAN notification indication in a particular time interval. That is, the UE in the RRC_INACTIVE state may periodically monitor an RAN notification indication on a notification occasion.

In step S730, the BS may receive downlink data from a gateway.

In step S740, when the BS receives the downlink data from the gateway, the BS may determine whether downlink data can be transmitted in the RRC_INACTIVE state or downlink data can be transmitted after transition to the RRC_ACTIVE state. That is, the BS may determine whether downlink data can be transmitted in the RRC_INACTIVE state without transition to the RRC_ACTIVE state or downlink data can be transmitted after state transition to the RRC_ACTIVE where handover is supported.

In step S750, the BS may transmit a notification indication to the UE. The notification indication may indicate whether downlink data is transmitted in the RRC_INACTIVE state. Additionally, the notification indication may indicate whether a downlink notification message is transmitted in the RRC_INACTIVE state. In this specification, a downlink notification message and a notification message may be the same message. Therefore, the UE may receive the notification indication from the BS on the notification occasion.

In step S760, upon receiving the notification indication, the UE may transmit an uplink message to the BB. The uplink message may indicate the UE ID or part of the UE ID.

In step S770, upon receiving the uplink message, when data is available for transmission through a radio bearer that is not suspended, the BS may transmit a downlink data unit to the UE via the radio bearer. The data unit may include a UE ID. For example, the UE ID may be included in a tail or a header of the data unit. The data unit may be either downlink user data or a notification message.

Hereinafter, a procedure in which a UE receives downlink user data in the RRC_INACTIVE state and a procedure in which a UE receives downlink user data after transitioning to the RRC_ACTIVE state will be described in detail with reference to FIG. 8 to FIG. 10.

Figure 8:
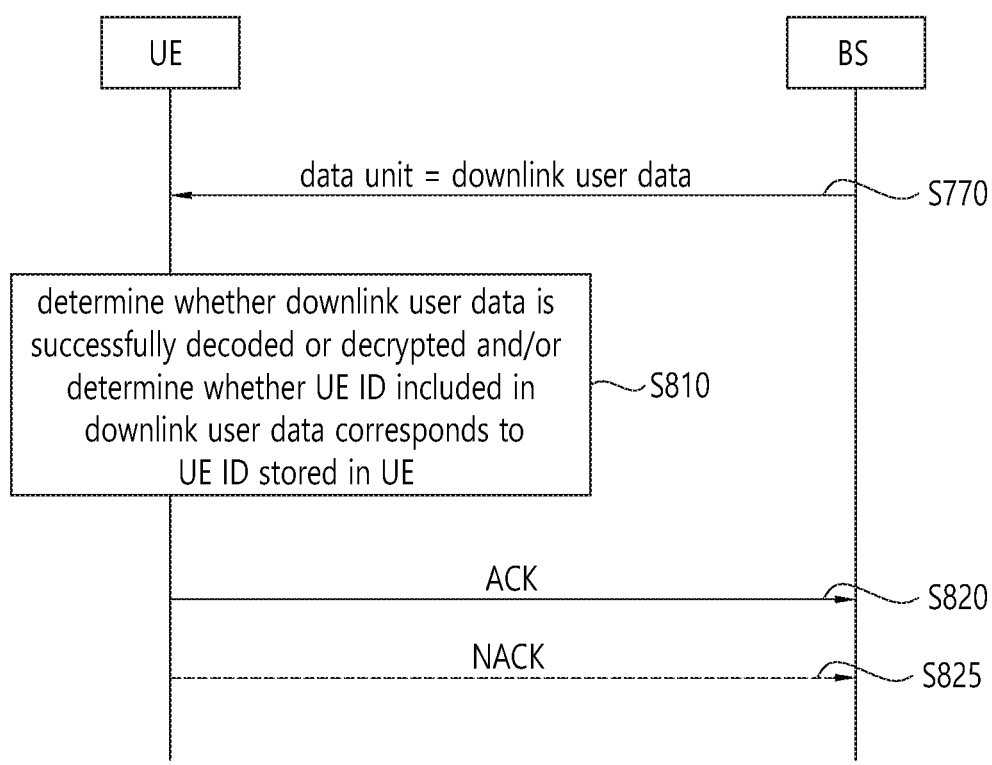
FIG. 8 illustrates a procedure in which a UE receives downlink user data in the RRC_INACTIVE state according to an embodiment of the present invention.

FIG. 8 illustrates a procedure in which a UE receives downlink user data in the RRC_INACTIVE state according to an embodiment of the present invention.

Referring to FIG. 8, the downlink data unit transmitted by the BS in step S770 of FIG. 7 may be downlink user data. That is, in step S770, the UE in the RRC_INACTIVE state may receive the downlink user data from the BS via a data radio bearer. For example, when the notification indication transmitted by the BS in step S750 of FIG. 7 indicates that downlink data is transmitted in the RRC_INACTIVE state, the UE in the RRC_INACTIVE state may receive downlink user data from the BS through a data radio bearer. Then, the UE may decode or decrypt the downlink user data.

In step S810, the UE may determine whether the downlink user data is successfully decoded or decrypted. Alternatively, the UE may determine whether a UE ID included in the downlink user data corresponds to a UE ID stored in the UE.

In step S820, when the downlink user data is successfully decoded or decrypted and/or the UE ID included in the downlink user data corresponds to the UE ID stored in the UE, the UE may transmit an ACK to the BS. Otherwise, in step S825, the UE may transmit a NACK to the BS or may not transmit anything.

Figure 9:
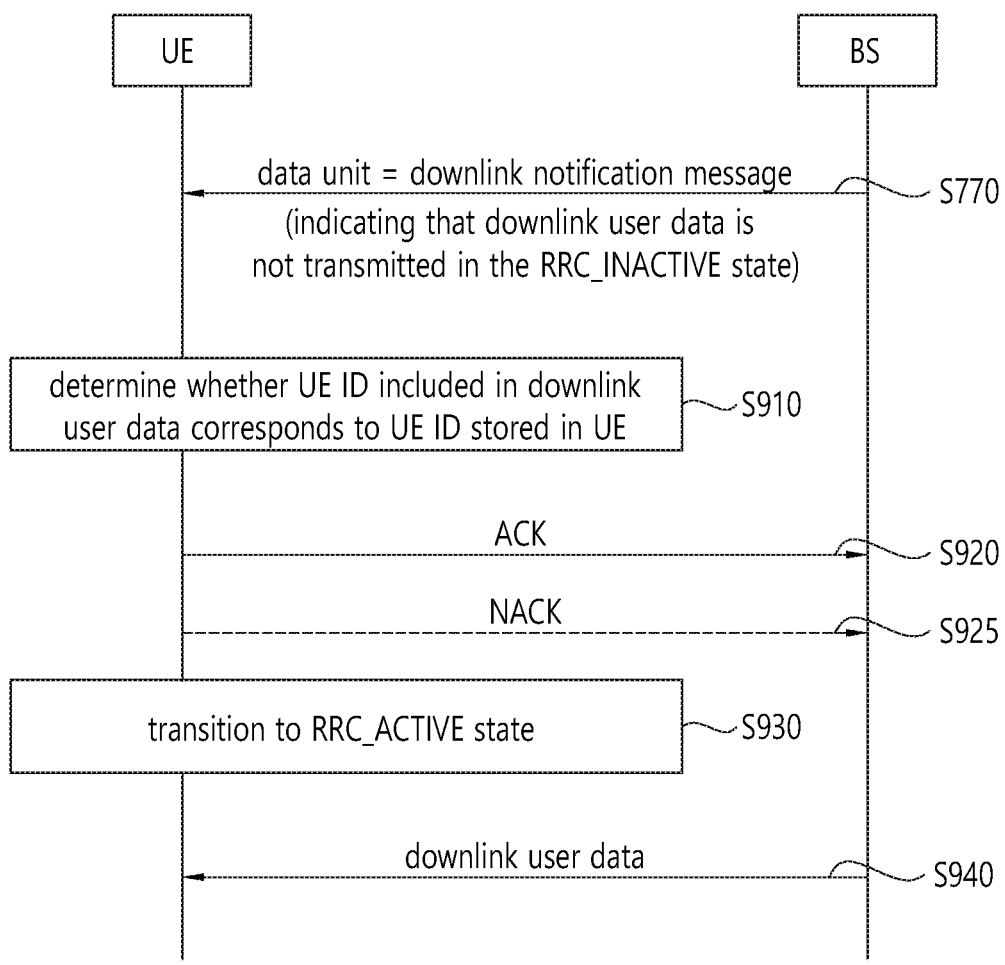
FIG. 9 illustrates a procedure in which a UE receives downlink user data in the RRC_ACTIVE state according to an embodiment of the present invention.

FIG. 9 illustrates a procedure in which a UE receives downlink user data in the RRC_ACTIVE state according to an embodiment of the present invention.

Referring to FIG. 9, the downlink data unit transmitted by the BS in step S770 of FIG. 7 may be a downlink notification message. That is, in step S770, the UE in the RRC_INACTIVE state may receive a downlink notification message from the BS via a signaling radio bearer or an MAC control element.

For example, when the notification indication transmitted by the BS in step S750 of FIG. 7 indicates that downlink data is not transmitted in the RRC_INACTIVE state, the UE in the RRC_INACTIVE state may receive a downlink notification message from the BS.

For example, when the notification indication transmitted by the BS in step S750 of FIG. 7 indicates that a downlink notification message is transmitted in the RRC_INACTIVE state, the UE in the RRC_INACTIVE state may receive a downlink notification message from the BS.

In step S910, the UE may determine whether a UE ID included in the downlink notification message corresponds to a UE ID stored in the UE.

In step S920, when the UE ID included in the downlink notification message corresponds to the UE ID stored in the UE and the downlink notification message does not indicate downlink transmission in the RRC_INACTIVE state, the UE may transmit an ACK to the BS. Otherwise, in step S925, the UE may transmit a NACK to the base station or may not transmit anything. The ACK may be an RRC message used for transition to the RRC_ACTIVE state. Alternatively, the ACK may be an RRC message used for area update in the RRC_INACTIVE state.

In step S930, the UE may transition to the RRC_ACTIVE state.

In step S940, the UE that has transitioned to the RRC_ACTIVE state may receive downlink user data from the BS through any radio bearer.

Figure 10:
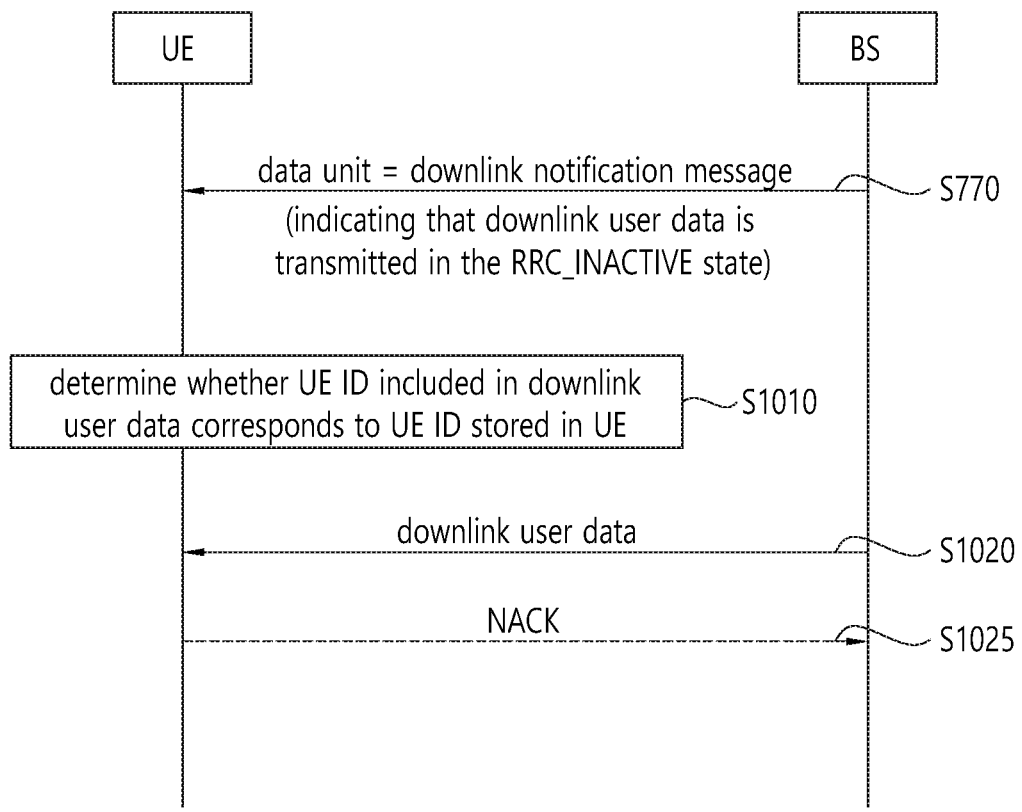
FIG. 10 illustrates a procedure in which a UE receives downlink user data in the RRC_INACTIVE state according to an embodiment of the present invention.

FIG. 10 illustrates a procedure in which a UE receives downlink user data in the RRC_INACTIVE state according to an embodiment of the present invention.

Referring to FIG. 10, the downlink data unit transmitted by the BS in step S770 of FIG. 7 may be a downlink notification message. That is, in step S770, the UE in the RRC_INACTIVE state may receive a downlink notification message from the BS via a signaling radio bearer or an MAC control element.

For example, when the notification indication transmitted by the BS in step S750 of FIG. 7 indicates that downlink data is transmitted in the RRC_INACTIVE state, the UE in the RRC_INACTIVE state may receive a downlink notification message from the BS.

For example, when the notification indication transmitted by the BS in step S750 of FIG. 7 indicates that a downlink notification message is transmitted in the RRC_INACTIVE state, the UE in the RRC_INACTIVE state may receive a downlink notification message from the BS.

In step S1010, the UE may determine whether a UE ID included in the downlink notification message corresponds to a UE ID stored in the UE.

In step S1020, when the UE ID included in the downlink notification message corresponds to the UE ID stored in the UE and the downlink notification message indicates downlink transmission in the RRC_INACTIVE state, the UE may receive downlink user data in the RRC_INACTIVE state according to the downlink notification message. Otherwise, in step S1025, the UE may transmit a NACK to the base station or may not transmit anything.

That is, the UE may receive the downlink user data according to the downlink notification message without transitioning to the RRC_ACTIVE state. The downlink notification message may include scheduling information about the downlink user data. The scheduling information about the downlink user data may include at least one of the time in which the downlink user data is transmitted, a frequency at which the downlink user data is transmitted, a modulation and coding scheme (MCS), a resource block, the number of retransmission times, and a DRX configuration.

According to an embodiment of the present invention, when a BS has a small amount of downlink user data to transmit to a UE, the BS may transmit the downlink user data to the UE in the RRC_INACTIVE state according to the procedures of FIG. 7 and FIG. 8. When the BS has a large amount of downlink user data to transmit to the UE, the BS may transmit the downlink user data to the UE after transitioning the UE to the RRC_ACTIVE state according to the procedures of FIG. 7 and FIG. 9. When the BS has a medium amount of downlink user data to transmit to the UE, the BS may provide scheduling information to the UE and may then transmit the downlink user data to the UE in the RRC_INACTIVE state according to the procedures of FIG. 7 and FIG. 10. For example, whether the amount of data is large or small may be determined on the basis of a predefined threshold value. Therefore, according to the embodiment of the present invention, the BS may efficiently provide downlink user data to the UE in the RRC_INACTIVE state.

Figure 11:
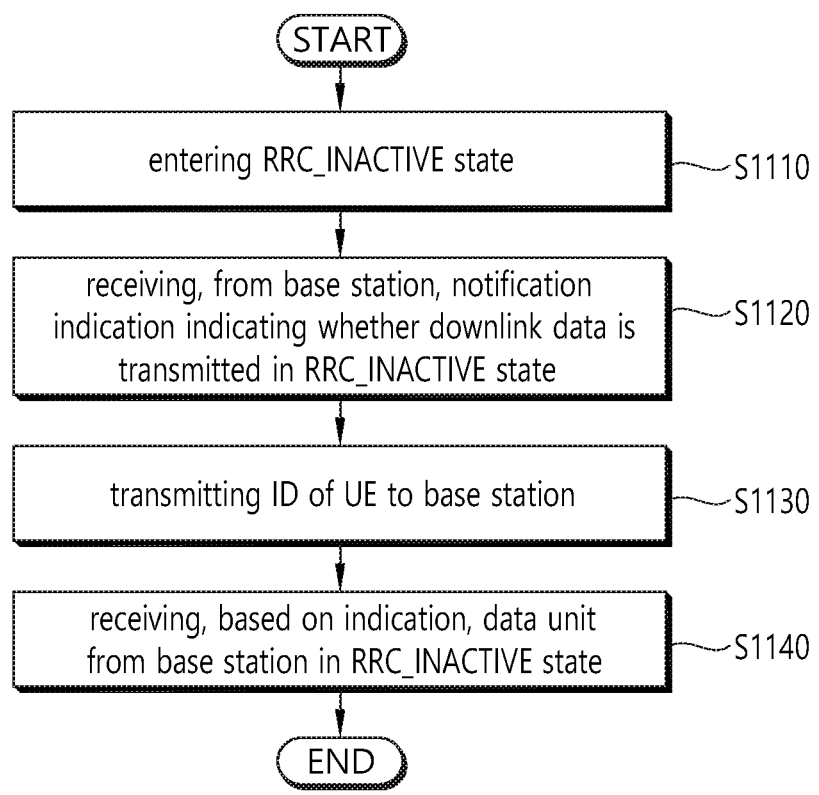
FIG. 11 is a block diagram illustrating a method in which a UE receives downlink user data according to an embodiment of the present invention.

FIG. 11 is a block diagram illustrating a method in which a UE receives downlink user data according to an embodiment of the present invention.

Referring to FIG. 11, in step S1110, the UE may enter the RRC_INACTIVE state.

In step S1120, the UE may receive, from a BS, a notification indication indicating whether downlink data is transmitted in the RRC_INACTIVE state. The notification indicator may further indicate whether a downlink notification message is transmitted in the RRC_INACTIVE state.

In step S1130, the UE may transmit an ID of the UE to the BS.

In step S1140, the UE may receive a data unit from the BS on the basis of the indication in the RRC_INACTIVE state. The data unit may be received from the BS in response to the ID of the UE.

When the notification indication indicates that downlink data is transmitted in the RRC_INACTIVE state, the data unit may be downlink user data received over a data radio bearer (DRB) in the RRC_INACTIVE state. In addition, when a UE ID included in the downlink user data corresponds to the ID of the UE, the UE may transmit an ACK to the BS.

When the notification indication indicates that downlink data is transmitted in the RRC_INACTIVE state, the data unit may be a downlink notification message received over a signaling radio bearer (SRB) or an MAC control element in the RRC_INACTIVE state. In addition, when a UE ID included in the downlink notification message corresponds to the ID of the UE and the downlink notification message indicates that downlink user data is transmitted in the RRC_INACTIVE state, the UE may receive downlink user data on the basis of the downlink notification message in the RRC_INACTIVE state. The downlink notification message may include scheduling information about the downlink user data. The scheduling information about the downlink user data may include at least one of the time in which the downlink user data is transmitted, a frequency at which the downlink user data is transmitted, a modulation and coding scheme (MCS), a resource block, the number of retransmission times, and a DRX configuration.

When the notification indication indicates that downlink data is not transmitted in the RRC_INACTIVE state, the data unit may be a downlink notification message received over a signaling radio bearer (SRB) or an MAC control element in the RRC_INACTIVE state. In addition, when a UE ID included in the downlink notification message corresponds to the ID of the UE and the downlink notification message indicates that downlink user data is not transmitted in the RRC_INACTIVE state, the UE may transmit an ACK to the BS. The ACK may be at least one of an RRC message used for transition from the RRC_INACTIVE state to the RRC_ACTIVE state or an RRC message used for area update in the RRC_INACTIVE state. Additionally, after transmitting the ACK to the BS, the UE may enter the RRC_ACTIVE state and may receive downlink user data from the BS in the RRC_ACTIVE state.

In addition, the UE may periodically monitor the notification indication on a notification occasion.

Figure 12:
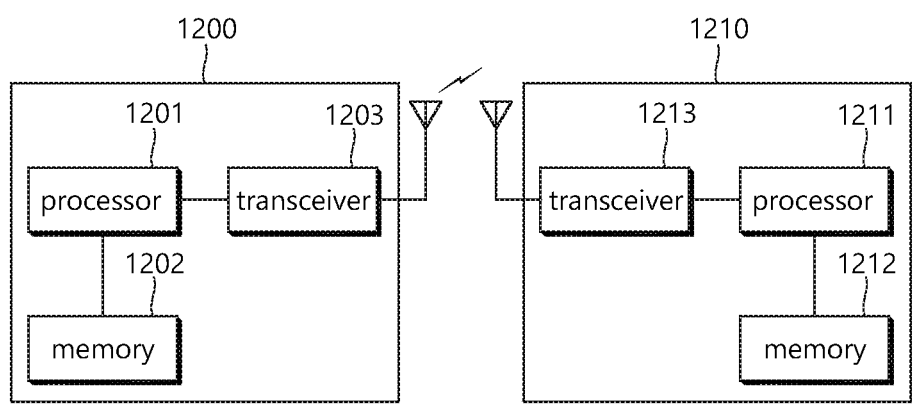
FIG. 12 is a block diagram illustrating a wireless communication system according to an embodiment of the present invention.

FIG. 12 is a block diagram illustrating a wireless communication system according to an embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the BS may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the UE may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a user equipment (UE) in a wireless communication system, the method comprising:
   (1) while in an RRC_CONNECTED state:
   receiving, from a base station (BS), a first configuration for a first set of one or more radio bearers;
   receiving, from the BS, a state transition command for state transition from the RRC_CONNECTED state to an RRC_INACTIVE state;
   receiving, from the BS, a second configuration for a second set of one or more radio bearers,
   wherein the second configuration indicates that data transmission in the RRC_INACTIVE state is allowed for the second set of one or more radio bearers; and
   suspending the first set of one or more radio bearers after receiving the state transition command;
   (2) while in the RRC_INACTIVE state in which the first configuration and the second configuration, which were received while in the RRC_CONNECTED state, are maintained:
   periodically monitoring a notification on a notification occasion for data transmission; and
   performing data transmission for at least one of the second set of one or more radio bearers without state transition to the RRC_CONNECTED state,
   wherein the second set of one or more radio bearers is not being suspended during data transmission,
   wherein encryption is applied to a data unit from at least one of the second set of one or more radio bearers,
   wherein an identity of the UE is transmitted to the BS for data transmission, and
   wherein an acknowledgement to data transmission is transmitted;
   (3) resuming at least the first set of one or more radio bearers based on the notification;
   performing state transition to the RRC_CONNECTED state; and
   performing data transmission for at least one of the first set of one or more radio bearers in the RRC_CONNECTED state.

2. The method of claim 1, wherein the first set of one or more radio bearers includes a data radio bearer (DRB).

3. The method of claim 1, wherein the UE communicates with at least one of a mobile terminal, a network or autonomous vehicles other than the UE.

4. The method of claim 1,
   wherein the notification includes scheduling information about data transmission,
   wherein the scheduling information includes a time in which the data transmission is performed, a frequency at which the data transmission is performed, a modulation and coding scheme (MCS), a resource block, and a number of retransmission times in the RRC_INACTIVE state.

5. The method of claim 4, wherein the scheduling information about the data transmission further includes a discontinuous reception (DRX) configuration.

6. The method of claim 1, further comprising:
   receiving the notification on the notification occasion;
   resuming at least the second set of one or more radio bearers based on the notification;

performing data transmission based on scheduling information indicated by the notification without state transition to the RRC_CONNECTED state.

7. The method of claim 1, wherein the state transition command and the second configuration for the second set of one or more radio bearers are included in a single RRC Release message.

8. The method of claim 1, wherein security is being activated for data transmission in the RRC_INACTIVE state.

9. A user equipment (UE) in a wireless communication system, the UE comprising:
a memory;
a transceiver; and
a processor to connect the memory and the transceiver, wherein the processor is configured to:
(1) while in an RRC_CONNECTED state:
control the transceiver to receive, from a base station (BS), a first configuration for a first set of one or more radio bearers;
control the transceiver to receive, from the BS, a state transition command for state transition from the RRC_CONNECTED state to an RRC_INACTIVE state;
control the transceiver to receive, from the BS, a second configuration for a second set of one or more radio bearers,
wherein the second configuration indicates that data transmission in the RRC_INACTIVE state is allowed for the second set of one or more radio bearers; and
suspend the first set of one or more radio bearers after receiving the state transition command;
(2) while in the RRC_INACTIVE state in which the radio bearer first configuration and the second configuration, which were received while in the RRC_CONNECTED state, are maintained:
periodically monitor a notification on a notification occasion for data transmission; and
control the transceiver to perform data transmission for at least one of the second set of one or more radio bearers without state transition to the RRC_CONNECTED state,
wherein the second set of one or more radio bearers is not being suspended during data transmission,
wherein encryption is applied to a data unit from at least one of the second set of one or more radio bearers,
wherein an identity of the UE is transmitted to the BS for data transmission, and
wherein an acknowledgement to data transmission is transmitted;
(3) resume at least the first set of one or more radio bearers based on the notification;
perform state transition to the RRC_CONNECTED state; and
control the transceiver to perform data transmission for at least one of the first set of one or more radio bearers in the RRC_CONNECTED state.

* * * * *